May 21, 1929.  L. L. WILLIAMS  1,714,479
MOLDING FOR AUTOMOBILE BODIES AND THE LIKE
Filed Feb. 6, 1928
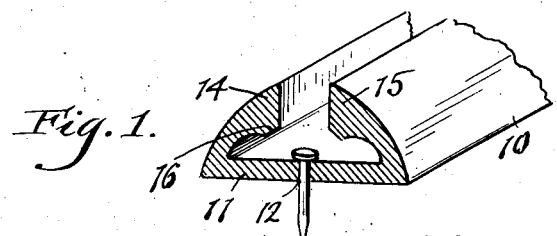
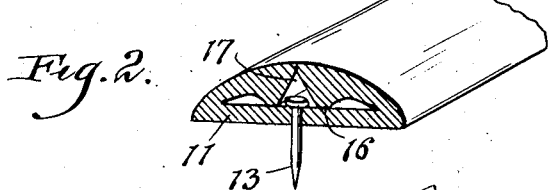
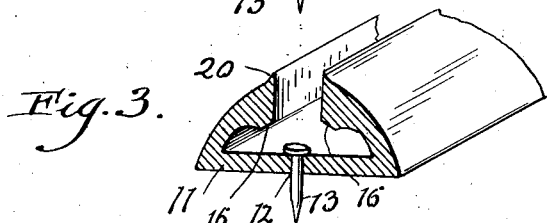
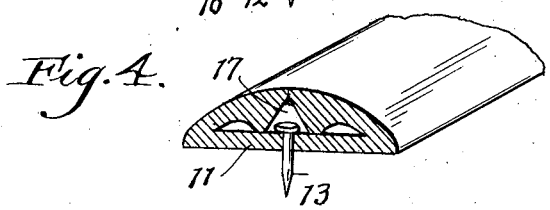
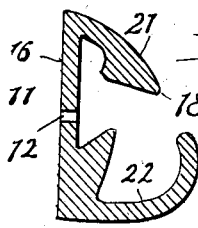
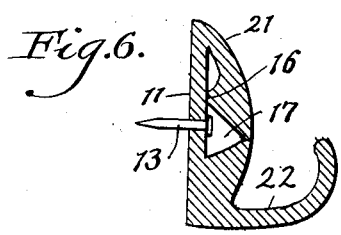
Inventor
Leo L. Williams
By Kwis Hudson & Kent
Attorneys Patented May 21, 1929.

1,714,479

UNITED STATES PATENT OFFICE.

LEO L. WILLIAMS, OF CLEVELAND HEIGHTS, OHIO.

MOLDING FOR AUTOMOBILE BODIES AND THE LIKE.

Application filed February 6, 1928. Serial No. 252,094.

This invention relates to moldings, such for example as are employed in the manufacture of automobile bodies and elsewhere for purposes of ornamentation and for covering joints in the construction of the body or other device to which the molding is applied.

The present invention covers certain improvements over the moldings disclosed in my prior applications No. 85,473, filed February 2, 1926, and No. 234,288, filed November 18, 1927.

An object of the invention is to provide a molding which may be more economically manufactured, and which may be applied with greater facility than the moldings disclosed in my applications above referred to.

Other objects and the advantages to be derived through practice of the invention will become apparent from the following specification, considered in connection with the accompanying drawings illustrating the invention, wherein—

Fig. 1 is a view partly in perspective and partly in section illustrating a section of molding strip formed in accordance with the invention.

Fig. 2 is a similar view illustrating the form assumed by the molding after its application to a car body or other member.

Figs. 3 and 4 are similar views illustrating a slightly modified form which the invention may assume.

Figs. 5 and 6 are sectional views illustrating the invention applied to a so-called drip molding.

Fig. 7 is a sectional view illustrating another modification.

Fig. 8 is a similar view illustrating a further modification.

The moldings disclosed in my prior applications consist of strips of extruded malleable metal, the base portions thereof being provided with counter-sunk apertures adapted to receive retaining devices and one or more longitudinally extending portions or lips adapted to be folded inwardly so as to cover the heads of the retaining devices and present a smooth unbroken exterior and a tightly closed joint.

In the present invention the strip is so formed that in closing the deformable portions or lips a longitudinally extending cavity is formed which provides ample space for the heads of the retaining devices, thus doing away with the necessity of counter-sinking the holes for the retaining devices, and at the same time does not detract from the rigidity of the structure. Accordingly, the amount of time and labor consumed in applying the molding is considerably reduced.

Referring particularly to Figs. 1 and 2 of the drawing, which illustrate the invention in one of its embodiments, the numeral 10 designates a section of molding as it is delivered from an extruding machine. The strip which is channel shaped comprises a substantially flat base portion 11 which after the extrusion is provided with apertures 12 for receiving retaining devices 13. Longitudinally extending portions or lips 14 and 15 having curved outer surfaces are formed on the strip at either side of the base 11 and these portions are adapted to be folded or driven inwardly after the molding is applied, until their edges meet and solidly abut becoming substantially welded together so that practically no seam is visible on the outer surface, the outer surface being smooth and rounded substantially as illustrated in Fig. 2.

The inner surfaces of the longitudinally extending lips are, in accordance with the present invention, formed with thickened portions or ribs 16, which, when the molding is applied, are driven against the base 11 and serve as abutments or supports to hold the device in proper shape.

In order to render unnecessary the countersinking of the apertures 12, the lips 14 and 15 are so formed that when they are driven together the adjacent faces diverge toward the base or have the effect of being undercut resulting in a longitudinally extending channel 17 within which the heads of the retaining devices are disposed. It will be noted that, as in the case of my prior application No. 234,288, the metal is also relieved adjacent the junction of the base and the longitudinally extending lips in order to facilitate the bending operation.

In Figs. 3 and 4 there is illustrated a modified form which the invention may assume. In this case the molding is provided with a slight excess of metal at the edges of the lips on the outer surfaces thereof, as indicated by the numeral 20, which metal is driven in between the meeting edges as the portions are folded together so as to produce a substantially smooth joint.

Figs. 5 and 6 illustrate the invention as embodied in a so-called drip molding. In this form the strip 10 is provided with a single lip 21 at one side, the opposite side being formed as a gutter 22. The relation of the several portions in open and closed positions is clearly apparent from the drawing and further description of these figures is deemed unnecessary.

In Fig. 7 the invention is illustrated as applied to a double molding, such as may be used in the construction of bus bodies. This modification is also believed to be perfectly apparent from the drawing.

The modification illustrated by Fig. 8 is practically a reversal of that shown by Fig. 7. In this instance the longitudinally extending lips are adapted to be folded inwardly toward the base of the strip against stationary abutments provided adjacent the edges of the strip instead of being folded toward each other as in the previous form. An advantage of this form lies in the fact that the retaining devices may be disposed at an angle to each other, or, in other words "toenailed," thus providing a practical locking together of the parts. The supporting ribs and the channel for receiving the heads of the retaining devices are practically identical with those of the other forms illustrated.

It is to be noted that with the construction illustrated in Figs. 1 to 4 when the two lips are driven inwardly to close the longitudinally extending channel or groove the free edge of one lip abuts solidly against the free edge of the other lip. At the same time the longitudinally extending ribs or abutments 16 engage the base of the groove or channel to limit the inward swinging movement of the lips under the action of the closing tool. On the other hand, with the constructions illustrated in Figs. 5, 6 and 7, the free edge of the lip abuts solidly against a stationary shoulder or abutment in the closing operation, this occurring at the same time that the longitudinally extending rib or abutment 16 engages the base of the groove. In either case, i. e., whether the molding has one lip or two lips, the free edge of the lip is caused to solidly engage a shoulder or abutment so that when the channel or groove is closed a closed or sealed joint is obtained and all evidence of a seam is practically eliminated. This feature is present in the constructions illustrated in both of my prior applications above referred to. In one respect the constructions herein illustrated approach the constructions illustrated in my second application Serial No. 234,288 in that the metal is relieved inwardly of and adjacent the base of the lip, and in both applications there is a longitudinally extending shoulder or rib between the lip and the base. In my second application Serial No. 234,288, the longitudinally extending rib or shoulder is formed integral with the base. In this case it is formed integral with the lip, the present construction having the advantage that the clearance is provided on the inner side of the lip or lips forming a longitudinally extending, internal groove or channel providing a clearance for the heads of the retaining devices.

It was previously stated that the parts which are caused to solidly abut in the closing operation become substantially welded together so that practically no seam is visible on the outer surface. While the parts are not actually welded together in a true sense of the word there is nevertheless a certain flowing of the metal at the abutting surfaces and this results in a superficial coalescence and, therefore, a superficial welding. It results also in a joint so tightly closed that the evidence of the joint or seam is practically eliminated giving the effect of one continuous piece over the top of the molding and it is in that sense that the word "weld" is used in the specification and claims.

It will thus be understood that the invention presents a distinct advance in the molding art, in that it provides a finishing strip or molding which may be manufactured at a minimum cost and may be applied with greater facility than the previous types, at the same time providing a rigid construction.

While I have described the invention in its preferred embodiment and have illustrated this form in detail together with certain modifications, it will be apparent that the invention may assume numerous other forms without departing from the spirit thereof or from the scope of the appended claims.

Having thus described my invention what I claim is:

1. A one-piece molding of malleable or pliant metal having a base through which retaining devices are adapted to be inserted and having two continuous longitudinally extending shoulder portions at least one of which is at the free edge of a lip foldable inwardly onto the base after the retaining devices are inserted with the shoulder portions solidly abutting and superficially welded, the lip being undercut and forming a channel on the interior of the closed molding for the heads of the retaining devices.

2. A one-piece molding of malleable or pliable metal having a base and two continuous longitudinally extending shoulder portions at least one of which is formed at the free edge of an inwardly foldable lip having a rib on its under surface and of such width that in the closing operation the rib engages the base and the shoulder portions solidly abut with such a displacement or flowing of the metal at the engaging surfaces that in effect the top of the closed molding is formed of one solid and substantially uninterrupted part.

3. A channel shaped one-piece molding of malleable or pliable metal having a base through which retaining devices are adapted to be inserted and two continuous inwardly foldable lips or flanges of such width and shape that in the closing operation after the retaining devices are inserted they are bent down onto the base so as to straddle the heads of the retaining devices, and the free edges of the lips or flanges solidly abut so as to have substantially the appearance and effect of being welded.

4. A channel shaped one-piece molding of malleable or pliable metal having a base through which retaining devices are adapted to be inserted and having two continuous flanges which have ribs on their inner surfaces and which are of such width that in the closing operation the flanges are bent inwardly so that the ribs engage the base on opposite sides of the heads of the retaining devices and the free edges of the flanges solidly abut with sufficient flow or displacement of metal to form a substantially one piece or unbroken top surface.

In testimony whereof, I hereunto affix my signature.

LEO L. WILLIAMS.